United States Patent [19]

Etoh

[11] Patent Number: 5,534,569
[45] Date of Patent: Jul. 9, 1996

[54] RUBBER COMPOSITION

[75] Inventor: Akiko Etoh, Saitama-ken, Japan

[73] Assignee: Bridgestone Corporation, Tokyo, Japan

[21] Appl. No.: 400,479

[22] Filed: Mar. 8, 1995

Related U.S. Application Data

[63] Continuation of Ser. No. 120,451, Sep. 13, 1993, abandoned, which is a continuation of Ser. No. 763,832, Sep. 23, 1991, abandoned.

[30] Foreign Application Priority Data

Sep. 27, 1990 [JP] Japan .................................... 2-255309

[51] Int. Cl.$^6$ .................. C08K 5/16; C08K 5/24
[52] U.S. Cl. .................. 524/99; 524/191; 524/192; 524/193; 524/194; 528/61; 528/64
[58] Field of Search .................. 524/99, 191, 192, 524/193, 194; 528/61, 64

[56] References Cited

U.S. PATENT DOCUMENTS

| | | | |
|---|---|---|---|
| 3,149,998 | 9/1964 | Thurmaier | 524/192 |
| 3,152,101 | 10/1964 | Dolce | 524/192 |
| 3,562,205 | 2/1971 | Richart | 524/191 |
| 3,718,628 | 2/1973 | Boyer et al. | 525/346 |
| 3,862,882 | 1/1975 | Marzocchi | 524/192 |
| 3,929,726 | 12/1975 | Schollenberger et al. | 524/191 |
| 3,954,904 | 5/1976 | Yonemitsu et al. | 524/191 |
| 4,124,750 | 11/1978 | O'Mahoney, Jr. | 526/20 |
| 4,607,060 | 8/1986 | Kmiec et al. | 521/89 |
| 5,026,749 | 6/1991 | Cantatore et al. | 524/99 |

FOREIGN PATENT DOCUMENTS

| | | |
|---|---|---|
| 23409 | 6/1985 | Japan . |
| 909753 | 11/1962 | United Kingdom . |
| 1330393 | 9/1973 | United Kingdom . |

*Primary Examiner*—Paul R. Michl
*Assistant Examiner*—Olga Asinovsky
*Attorney, Agent, or Firm*—Sughrue, Mion, Zinn, Macpeak & Seas

[57] ABSTRACT

Heat generation of a rubber composition can be lowered by incorporating to the composition a compound of the formula, (I), (II) or (III),

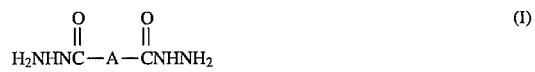

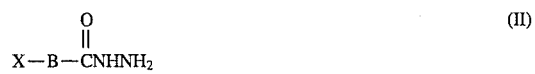

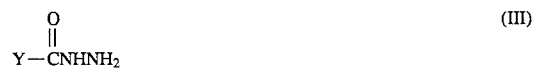

where A is an aromatic group, hydantoin ring or $C_{0-18}$ straight chain hydrocarbon group, B is an aromatic group, X is hydroxy or amino, Y is pyridyl or hydrozino.

8 Claims, No Drawings

RUBBER COMPOSITION

This is a Continuation of application Ser. No. 08/120,451, filed on Sep. 13, 1993; now abandoned which in turn is a Continuation of application Ser. No. 07/763,832, filed on Sep. 23, 1991, now abandoned.

BACKGROUND OF THE INVENTION

1. Field of the Invention

The present invention relates to a rubber composition of an improved heat generation containing a heat generation improver.

2. Description of the Related Art

In response to the social demand for resource and energy saving, developments for tires resulting in low fuel consumption have been vigorously carried out for many years in the rubber industry, in particular, in the tire industry.

For the development of low fuel consumption tires, low heat generating rubber compositions are indispensable.

Japanese Patent Application Laid-open No. 23409/1985 discloses that styrene-butadiene rubber (SBR) where the ends of molecule of which are modified with a particular compound is used for lowering the heat generation, in particular, in the field of tires of passenger cars. This method can be applied to a solution-polymerized SBR, but can not be effectively applicable to other rubbers, in particular, natural rubber widely used for tires of heavy vehicles and emulsion-polymerized SBR having excellent high temperature breaking characteristics.

SUMMARY OF THE INVENTION

An object of the present invention is to provide a rubber composition having improved heat generation characteristics.

Another object of the present invention is to provide a rubber heat generation improver applicable to a wide range of field including natural rubber and diene type synthetic rubbers, for example, emulsion-polymerized SBR.

According to the present invention, there is provided a rubber composition which comprises 100 parts by weight of at least one rubber selected from the group consisting of natural rubber and diene type synthetic rubbers, 20–150 parts by weight of a reinforcing filler, and 0.05–20 parts by weight of a compound selected from the group consisting of the compounds of the formulas (I)–(III),

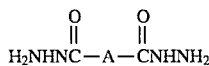  (I)

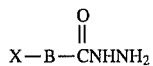  (II)

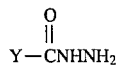  (III)

where A is a member selected from the group consisting of an aromatic group, substituted or unsubstituted hydantoin ring, and saturated or unsaturated straight chain hydrocarbon group having 0–18 carbon atoms, B is an aromatic group, X which is a substituent attached to B is at least one selected from the group consisting of hydroxy and amino, and Y is a member selected from the group consisting of pyridyl and hydrazino.

DESCRIPTION OF THE PREFERRED EMBODIMENT

Exemplary suitable compounds of the formula (I) include compounds of formula (I) where A is an aromatic ring having no substituent other than the hydrazinocarbonyl groups, that is, the following compounds:

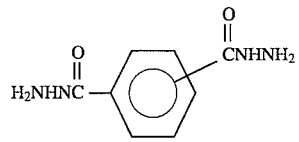

Further exemplary suitable compounds of formula (I) are those having the group A which is a substituted hydantoin ring such as

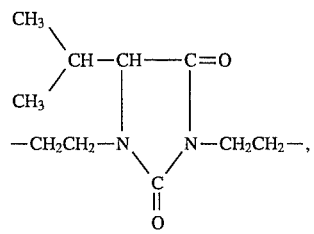

saturated or unsaturated straight chain hydrocarbon groups having 0–18 carbon atoms such as ethylene group, tetramethylene group, heptamethylene group, octamethylene group, octadecamethylene group, 7,11-octadecadienylene group and the like.

Exemplary suitable compounds of formula (I) include phthalic dihydrazide, isophthalic dihydrazide, terephthalic dihydrazide, 1,3-bis(hydrazinocarboethyl)-5-isopropylhydantoin

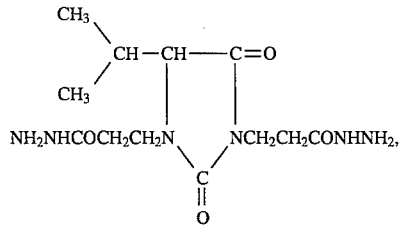

succinic dihydrazide, adipic dihydrazide, azelaic dihydrazide, sebacic dihydride, eicosane dicarboxylic acid dihydrazide, 7,11-octadecadiene-1,18-dicarbohydrazide, and oxalic dihydrazide.

Preferable compounds of formula (II) include those where the aromatic group of B is phenyl or naphthyl and X which is a substituent attached to B is hydroxy or amino.

Exemplary suitable compounds of formula (II) are:

Anthraniloylhydrazine 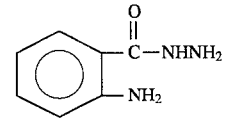

Salicylic hydrazide 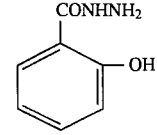

4-Hydroxybenzoic hydrazide

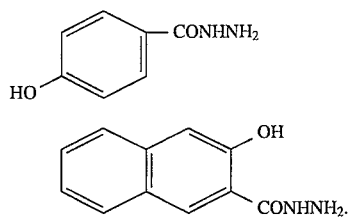

2-Hydroxy-3-naphthoic hydrazide

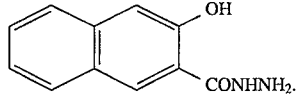

Preferable compounds of formula (III) include those where Y is pyridyl or hydrazino.

Exemplary suitable compounds of formula (III) include

Isonicotinic hydrazide

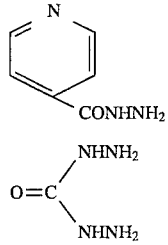

Carbodihydrazide

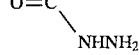

The compounds of formulas (I), (II) and (III) exhibit excellent heat generation improving effect when they are compounded in rubber.

Rubbers which may be used in the present invention are, for example, natural rubber, synthetic polyisoprene rubber, styrene-butadiene copolymer rubber, polybutadiene rubber, and butyl rubber. These rubbers may be used alone or in combination.

In the present invention, the above-mentioned heat generation improvers may be used alone or in combination. The amount of the heat generation improver to be compounded is 0.05–20 parts by weight, preferably 0.1–5 parts, more preferably 0.25–5 parts.

When the amount of the heat generation improver is less than 0.05 part by weight, the heat generation improving effect can be hardly expected. When the amount exceeds 20 parts by weight, the heat generation improving effect does not increase any more and sometimes mechanical properties of the rubber composition rather decrease.

As the reinforcing filler used in the present invention, there may be mentioned carbon black and the like, and the amount to be used is 20–150 parts by weight.

When the amount is less than 20 parts by weight, the rubber composition is not sufficiently reinforced. When the amount exceeds 150 parts by weight, the heat generation characteristics of rubber become worse and in addition, the abrasion resistance and other physical properties are deteriorated.

In the present invention, if necessary, there may be appropriately added to the rubber composition softening agents, antioxidants, vulcanization accelerators, vulcanization accelerating auxiliary agents, vulcanizing agents and the like which are additives usually used in rubber industry.

The rubber composition of the present invention may be used for various rubber products such as tires, conveyer belts, hoses and the like.

The invention is now particularly described with reference to the following examples which are for the purpose of illustration only and are intended to imply no limitation thereon.

EXAMPLES 1–14 AND COMPARISON EXAMPLE 1

One hundred parts by weight of natural rubber was compounded with 50 parts by weight of ISAF carbon black, 3 parts by weight of stearic acid, one part by weight of N-(1,3-dimethylbutyl)-N'-phenyl-p-phenylenediamine, 5 parts by weight of zinc oxide, one part by weight of N-tert-butyl-2-benzothiazole sulfeneamide, 1.5 parts by weight of sulfur and 1/200 mole of an heat generation improver selected from Table 1 to prepare a rubber composition.

In the same manner, various rubber compositions were prepared using heat generation improvers in Table 1.

The resulting rubber compositions were kneaded with a Banbury mixer and vulcanized to prepare samples. The low heat generation characteristic was evaluated.

For comparison, a sample prepared by repeating the above-mentioned procedure except that no heat generation improver was added was also evaluated as to the low heat generation characteristic.

The results are shown in Table 1. The low heat generation index was calculated by the following formula where tan δ was measured at 50° C. at a dynamic strain of 5% with a frequency of 15 Hz by means of a viscoelasticity measuring apparatus manufactured by Rheometric Co.

$$\text{Low heat generation index} = \frac{\tan \delta \text{ (Blank)}}{\tan \delta \text{ (Heat generation improver compounded rubber)}} \times 100$$

The larger this index, the less the heat generation.

TABLE 1

| | Heat generation improver | Compounded amount | Low heat generation index |
|---|---|---|---|
| Example 1 | Isonicotinic hydrazide $\text{N}\bigcirc\text{—C(=O)—NHNH}_2$ | 0.69 | 114 |
| Example 2 | Isophthalic dihydrazide (with two —C(=O)—NHNH$_2$ groups on benzene) | 0.97 | 156 |
| Example 3 | Terephthalic dihydrazide $\text{H}_2\text{NHN—C(=O)—}\bigcirc\text{—C(=O)—NHNH}_2$ | 0.97 | 122 |
| Example 4 | Azelaic dihydrazide $\text{H}_2\text{NHN—C(=O)—(CH}_2)_7\text{—C(=O)—NHNH}_2$ | 1.08 | 140 |
| Example | Adipic | 0.87 | 134 |

TABLE 1-continued

| | Heat generation improver | Compounded amount | Low heat generation index |
|---|---|---|---|
| Example 5 | dihydrazide $$H_2NHN-\overset{O}{\underset{\|}{C}}-(CH_2)_4-\overset{O}{\underset{\|}{C}}-NHNH_2$$ | | |
| Example 6 | Succinic dihydrazide $$H_2NHN-\overset{O}{\underset{\|}{C}}-(CH_2)_2-\overset{O}{\underset{\|}{C}}-NHNH_2$$ | 0.73 | 115 |
| Example 7 | Carbodihydrazide $$H_2NHN-\overset{O}{\underset{\|}{C}}-NHNH_2$$ | 0.45 | 113 |
| Example 8 | 1,3-Bis(hydrazino-carboethyl)-5-iso-propylhydantoin | 1.57 | 142 |

$$\begin{array}{c} CH_3 \\ CH_3 \end{array}\!\!\!\!\!\diagdown\!\!CH-CH-\!\!\!\!\diagup\!\!\!C=O \\ H_2NHN-\underset{\|}{C}-CH_2CH_2-N\diagdown\!\!\!\!\diagup N-CH_2CH_2\underset{\|}{C}-NHNH_2 \\ O\phantom{xxxxxxxxx}\underset{\|}{C}\phantom{xxxxxx}O \\ \phantom{xxxxxxxxxxxxx}O$$

| | Heat generation improver | Compounded amount | Low heat generation index |
|---|---|---|---|
| Example 9 | Eicosanoic dicarboxylic acid dihydrazide $$H_2NHN-\overset{O}{\underset{\|}{C}}-(CH_2)_{18}-\overset{O}{\underset{\|}{C}}-NHNH_2$$ | 1.85 | 126 |
| Example 10 | 7,11-Octadecadiene-1,18-dicarbohydrazide | 1.83 | 118 |

$$(CH_2)_6CH=CH(CH_2)_2CH=CH(CH_2)_6 \\ \phantom{xxx}|\phantom{xxxxxxxxxxxxxxxxxxxxxx}| \\ O=C\phantom{xxxxxxxxxxxxxxxxxxxxx}C=O \\ \phantom{xxx}|\phantom{xxxxxxxxxxxxxxxxxxxxxx}| \\ N_2NHN\phantom{xxxxxxxxxxxxxxxxxxx}NHNH_2$$

| | Heat generation improver | Compounded amount | Low heat generation index |
|---|---|---|---|
| Example 11 | Anthraniloylhydrazine | 0.76 | 109 |
| Example 12 | Salicylic hydrazide | 0.76 | 110 |
| Example 13 | 4-Hydroxybenzoic hydrazide | 0.76 | 107 |
| Example 14 | 2-Hydroxy-3-naphthoic hydrazide | 1.01 | 154 |
| Comparison Example | (Blank) | — | 100 |

From the Examples, it is clear that the rubber heat generation improvers of the present invention exhibit a remarkable heat generation improving effect even when they are incorporated in rubber components such as natural rubber.

Therefore, the rubber composition of the present invention containing a specified amount of the heat generation improver and that of a reinforcing filler exhibits a significantly lowered heat generation without previously modifying the structure of rubber as compared with rubber compositions containing no heat generation improver.

Therefore, the rubber composition having improved heat generation characteristic of the present invention can be easily used in a wide range of technical field and is of a very large value of utilization.

What is claimed is:

1. A method of manufacturing a rubber composition having improved low heat generation properties consisting essentially of the step of kneading with a mixer, 100 parts by weight of at least one rubber selected from the group consisting of natural rubber, synthetic polyisoprene rubber, styrene-butadiene rubber and polybutadiene rubber, 20 to 150 parts by weight carbon black, and 0.05 to 20 parts by weight of a compound selected from the group consisting of isonicotinic hydrazide, 1,3-bis(hydrazinocarboethyl)-5-isopropylhydantoin, anthraniloylhydrazine, salicylic hydrazide, 4-hydroxybenzoic hydrazide and 2-hydroxy-3-naphthalic hydrazide.

2. The method of manufacturing a rubber composition according to claim 1, wherein said rubber is synthetic polyisoprene rubber.

3. A rubber composition consisting essentially of:

100 parts by weight of at least one rubber selected from the group consisting of natural rubber, synthetic polyisoprene rubber, styrene-butadiene rubber and polybutadiene rubber, 20 to 150 parts by weight of carbon black, and 0.05 to 20 parts by weight of 2-hydroxy-3-naphthalic hydrazide.

4. A rubber composition consisting essentially of:

100 parts by weight of at least one rubber selected from the group consisting of natural rubber and synthetic polyisoprene rubber, 20 to 150 parts by weight of carbon black, and 0.05 to 20 parts by weight of 2-hydroxy-3-naphthalic hydrazide.

5. A rubber composition consisting essentially of:

100 parts by weight of at least one rubber selected from the group consisting of natural rubber, synthetic polyisoprene rubber, styrene-butadiene rubber and polybutadiene rubber, 20 to 150 parts by weight of carbon black, and 0.05 to 20 parts by weight of isophthalic dihydrazide.

6. A rubber composition consisting essentially of:

100 parts by weight of at least one rubber selected from the group consisting of natural rubber and synthetic polyisoprene rubber, 20 to 150 parts by weight of carbon black, and 0.05 to 20 parts by weight of isophthalic dihydrazide.

7. The method of manufacturing a rubber composition according to claim 1, wherein said rubber is natural rubber.

8. The method of manufacturing a rubber composition having improved low heat generation properties consisting essentially of the step of kneading with a mixer, 100 parts by weight of at least one rubber selected from the group consisting of natural rubber, styrene-butadiene rubber, and polybutadiene rubber, 20 to 150 parts by weight of carbon black, and 0.05 to 20 parts by weight of isophthalic dihydrazide.

* * * * *